United States Patent [19]
Timperley

[11] Patent Number: 5,316,817
[45] Date of Patent: May 31, 1994

[54] VEHICULAR CAR MAT

[76] Inventor: Clive R. Timperley, 600 Thornton Rd. North, Ste. 207, Oshawa, Ontario, Canada, L1J 6T6

[21] Appl. No.: 982,849

[22] Filed: Nov. 30, 1992

[51] Int. Cl.$^5$ .............................. B32B 1/06; B32B 3/06
[52] U.S. Cl. ........................................ 428/78; 428/100; 428/120; 15/215
[58] Field of Search ...................... 428/77, 95, 120, 99, 428/100, 78; 15/215, 217

[56] References Cited

U.S. PATENT DOCUMENTS 3,696,459 10/1972 Kucera et al. ........................ 15/217

Primary Examiner—Alexander S. Thomas
Attorney, Agent, or Firm—E. Michael Combs

[57] ABSTRACT

A vehicular car mat includes a tray support having a plurality of recessed cup portions to each receive a multi-layered fibrous insert for ease of removal of the insert for maintenance and cleaning thereof. The support is of a flexible construction having a bottom surface, including a peripheral array of projections directed about the bottom surface, with a second array of projections positioned below the first recessed cup portion onto the bottom surface. The inserts each include a flexible polymeric base, having frictional engaging projections directed from the base for enhanced positioning and adherence within each respective cup portion.

4 Claims, 3 Drawing Sheets

VEHICULAR CAR MAT

BACKGROUND OF THE INVENTION

1. Field of the Invention

The field of invention relates to car mat structure, and more particularly pertains to a new and improved vehicular car mat wherein the same is arranged for ease of maintenance relative to extended use.

2. Description of the Prior Art

Car mat structure of the prior art has typically been of unitary construction requiring typical replacement, wherein the instant invention attempts to overcome deficiencies of the prior art wherein insert portions are mounted within an underlying tray support to permit removal of the inserts alone for their cleaning and maintenance. Prior art floor mat structure is indicated for example in U.S. Pat. 4,822,669; 4,798,754; 4,828,898 and 4,876,135.

Accordingly, the instant invention attempts to overcome deficiencies of the prior art by permitting the ease of removal of the selective inserts of the organization for maintenance and cleaning of the car mat structure and in this respect, the present invention substantially fulfills this need.

SUMMARY OF THE INVENTION

In view of the foregoing disadvantages inherent in the known types of car mat structure now present in the prior art, the present invention provides a vehicular car mat wherein the same employs removable inserts relative to an underlying support. As such, the general purpose of the present invention, which will be described subsequently in greater detail, is to provide a new and improved vehicular car mat which has all the advantages of the prior art vehicular car mats and none of the disadvantages.

To attain this, the present invention provides a vehicular car mat including a tray support having a plurality of recessed cup portions to each receive a multi-layered fibrous insert for ease of removal of the insert for maintenance and cleaning thereof. The support is of a flexible construction having a bottom surface, including a peripheral array of projections directed about the bottom surface, with a second array of projections positioned below the first recessed cup portion onto the bottom surface. The inserts each include a flexible polymeric base, having frictional engaging projections directed from the base for enhanced positioning and adherence within each respective cup portion.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular car mat which has all the advantages of the prior art vehicular car mats and none of the disadvantages.

It is another object of the present invention to provide a new and improved vehicular car mat which may be easily and efficiently manufactured and marketed.

It is a further object of the present invention to provide a new and improved vehicular car mat which is of a durable and reliable construction.

An even further object of the present invention is to provide a new and improved vehicular car mat which is susceptible of a low cost of manufacture with regard to both materials and labor, and which accordingly is then susceptible of low prices of sale to the consuming public, thereby making such vehicular car mats economically available to the buying public.

Still yet another object of the present invention is to provide a new and improved vehicular car mat which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by it uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
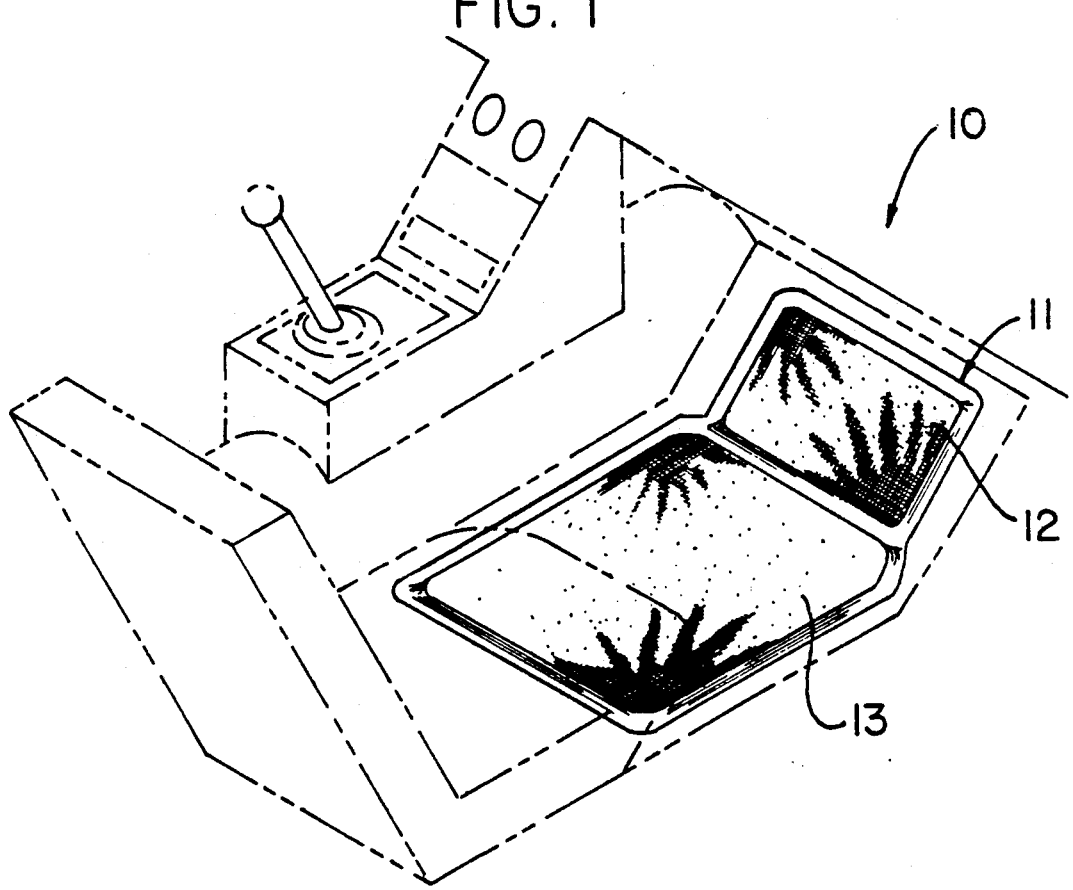
FIG. 1 is an isometric illustration of the invention.
Figure 2:
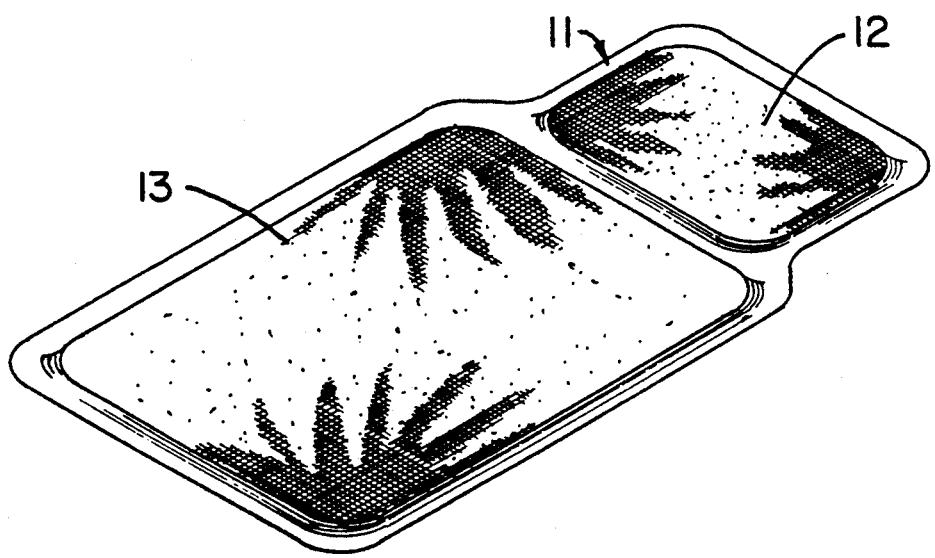
FIG. 2 is an isometric illustration of the invention indicated in an extended orientation.

With reference now to the drawings, and in particular to FIGS. 1 to 8 thereof, a new and improved vehicular car mat embodying the principles and concepts of the present invention and generally designated by the reference numeral 10 will be described.

Figure 3:
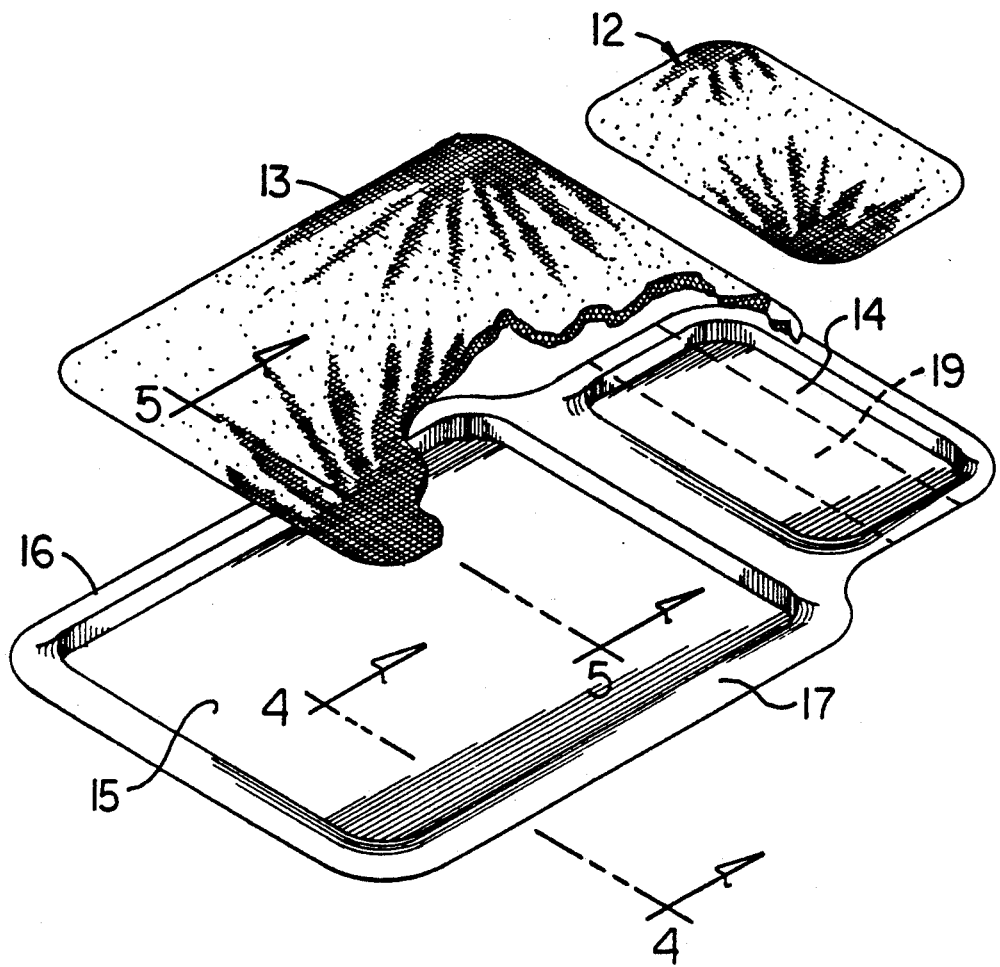
FIG. 3 is an isometric exploded view, partially in section, of the invention.

More specifically, the vehicular car mat 10 of the instant invention essentially comprises a flexible tray support 11, as indicated in FIG. 1, having respective first and second fibrous inserts 12 and 13 received within respective first and second recessed cup portions 14 and 15 (see FIG. 3). The first and second recessed cup portions 14 and 15 extend below a tray support top wall 16 of the tray support 11. The tray support further is formed with a tray support bottom wall 16a having a support flange 17 mounted peripherally about the tray support 11 extending laterally thereof, wherein the support flange 17 has a flange bottom surface substantially coplanar with the tray support bottom wall 16a.

Figure 4:
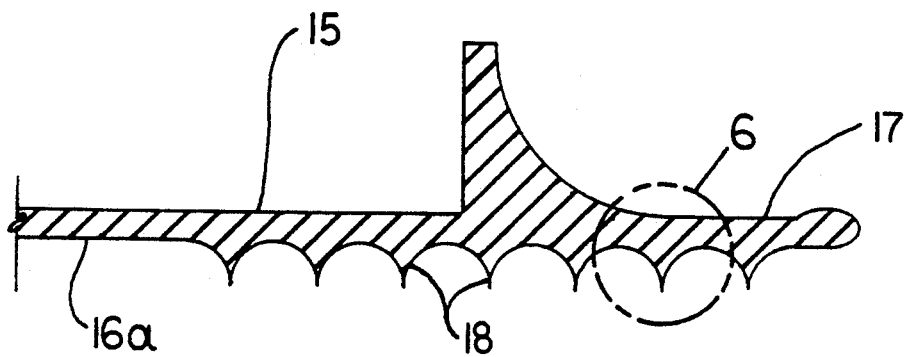
FIG. 4 is an orthographic view, taken along the lines 4—4 of FIG. 3 in the direction indicated by the arrows.
Figure 5:
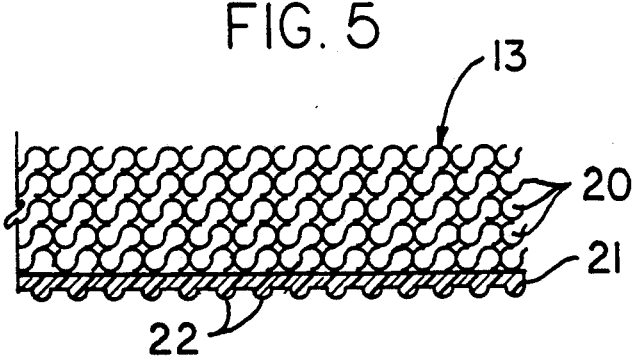
FIG. 5 is an orthographic view, taken along the lines 5—5 of FIG. 3 in the direction indicated by the arrows.
Figure 6:
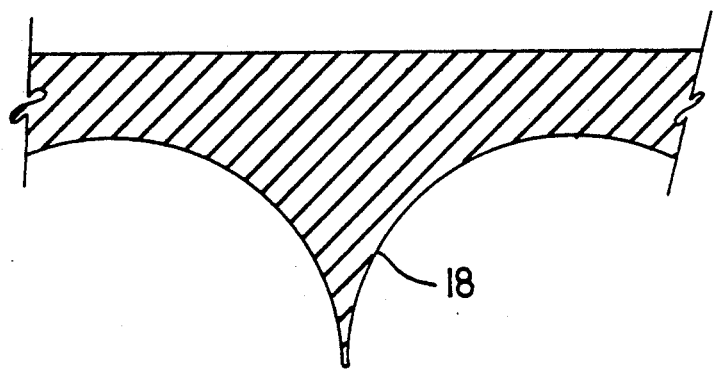
FIG. 6 is an enlarged orthographic view of section 6 as set forth in FIG. 4.

A continuous band of first locking projections 18 orthogonally project below the support flange bottom surface continuously about the tray support bottom wall, with the projections extending into the bottom wall, as indicated in FIG. 4, in a continuous array. A second continuous band of locking projections 19 extends below the first recessed cup portion 14 on the tray support bottom wall 16a, as indicated in FIG. 3, of a configuration as indicated in FIG. 4.

Figure 7:
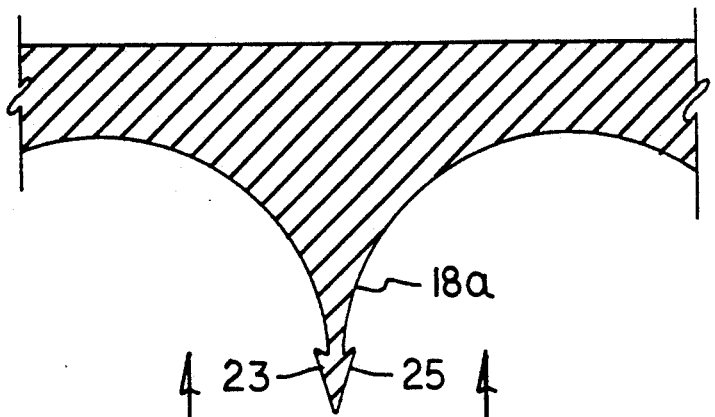
FIG. 7 is an orthographic view of a modified locking projection for use by the invention.
Figure 8:
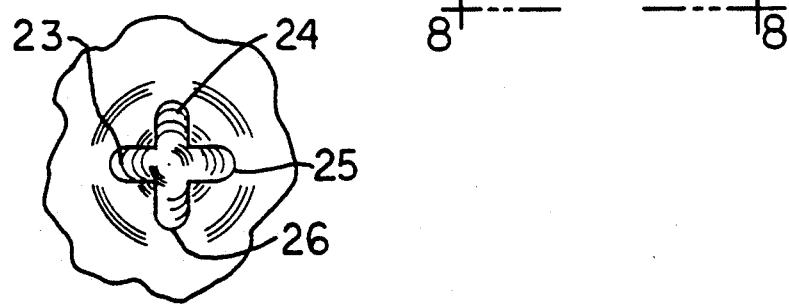
FIG. 8 is an orthographic view, taken along the lines 8—8 of FIG. 7 in the direction indicated by the arrows.

The FIGS. 7 and 8 indicates the use of modified locking projections 18a substituted for the first and second locking projections 18 and 19, with the modified locking projections 18a each having first, second, third, and fourth triangular projecting plates 23, 24, 25, and 26 respectively extending laterally relative to the locking projection to provide for enhanced locking surface when directing the tray support 11 into an underlying carpeting of an associated vehicle.

The first and second fibrous inserts 12 and 13 are formed of a plurality of fibrous layers 20 coextensive relative to one another, with the inserts each having a flexible polymeric insert base 21. The insert base 21 is of a generally fluid impermeable material having a matrix of insert base projections 22 of a generally semi-spherical configuration extending below the insert base 21 to provide for enhanced grasping within the tray support when the inserts 12 and 13 are positioned within a respective recessed cup portions 14 and 15.

In this manner, the car mat structure accommodates fluid preventing such fluid from extending beyond the first and second recessed cup portions 14 and 15 in typical use. As is understood, the car mat structure may be readily color coordinated to vehicular interiors and permits ease of replacement of the insert members 12 and 13 alone due to wear in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular car mat, comprising,
    a flexible tray support, the tray support having a top wall spaced from a bottom wall, with the top wall substantially coextensive with the bottom wall, and
    a first recessed cup portion directed into the tray support extending from the top wall, and
    a second recessed cup portion spaced from and in adjacency to the first recessed cup portion directed into the tray support from the top wall, with the first recessed cup portion and the second recessed cup portion spaced from the bottom wall, and
    a first fibrous insert complementarily received within the first recessed cup portion, and a second fibrous insert received within the second recessed cup portion, and
    the first fibrous insert and the second fibrous insert each include a plurality of fibrous layers, and each of the first and second fibrous inserts include a flexible polymeric insert base having a matrix of flexible base projections projecting below said insert base for adherence within the tray support.

2. A vehicular car mat as set forth in claim 1 wherein the tray support includes a support flange, and the support flange continuously directed about the tray support, and the support flange having a flange bottom surface, and the flange bottom surface coplanar with the bottom wall, and the bottom surface of the support flange includes a continuous band of first locking projections orthogonally mounted to the flange bottom surface.

3. A vehicular car mat as set forth in claim 2 wherein each of the locking projections includes a lower distal end, and each lower distal end includes respective first, second, third, and fourth triangular projections extending laterally beyond the locking projection spaced relative to one another.

4. A vehicular car mat as set forth in claim 3 including a second continuous band of locking projections fixedly mounted to the bottom wall positioned below the second recessed cup portion.

* * * * *